US012430991B2

(12) United States Patent
O'Donnell et al.

(10) Patent No.: US 12,430,991 B2
(45) Date of Patent: Sep. 30, 2025

(54) NODE-BASED GAME EVALUATION AND GAME PLAY

(71) Applicant: IGT, Las Vegas, NV (US)

(72) Inventors: Sean O'Donnell, Reno, NV (US);
Aaron P. Taylor, Reno, NV (US);
Janner Redera, Sparks, NV (US);
Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 164 days.

(21) Appl. No.: 18/226,955

(22) Filed: Jul. 27, 2023

(65) Prior Publication Data

US 2025/0032928 A1    Jan. 30, 2025

(51) Int. Cl.
G07F 17/32     (2006.01)
A63F 13/47     (2014.01)
A63F 13/5375   (2014.01)
A63F 13/69     (2014.01)

(52) U.S. Cl.
CPC .......... G07F 17/3262 (2013.01); A63F 13/47 (2014.09); A63F 13/5375 (2014.09); A63F 13/69 (2014.09); G07F 17/3267 (2013.01)

(58) Field of Classification Search
None
See application file for complete search history.

(56) References Cited

U.S. PATENT DOCUMENTS

| | | | |
|---|---|---|---|
| 6,733,386 B2 | 5/2004 | Cuddy et al. | |
| 7,833,095 B2 | 11/2010 | Cuddy et al. | |
| 8,147,334 B2 | 4/2012 | Gatto et al. | |
| 8,764,566 B2 | 7/2014 | Miltenberger et al. | |
| 11,045,731 B1* | 6/2021 | Reznik | A63F 13/35 |
| 2003/0060254 A1* | 3/2003 | Cuddy | G07F 17/3244 463/16 |
| 2021/0178261 A1* | 6/2021 | Li | G06N 7/01 |
| 2021/0362054 A1* | 11/2021 | Blok | A63F 13/47 |

* cited by examiner

Primary Examiner — Jason T Yen
(74) Attorney, Agent, or Firm — Sheridan Ross P.C.

(57) ABSTRACT

Embodiments of the present disclosure are directed to operating an electronic game according to a graph presentation representing a current state and possible future states for the game. Various embodiments described herein provide the player with a graph representing possible choices during game play with each choice influencing a future state and flow of the game. Embodiments allow player input as well as randomness to navigate the graph and determine the flow and outcomes of the game. Various embodiments determine how the player can navigate the graph, how the prizes are awarded based on the graph, and how the player can change the graph.

7 Claims, 7 Drawing Sheets

NODE-BASED GAME EVALUATION AND GAME PLAY

BACKGROUND

The present disclosure is generally directed to operating an electronic game on a gaming system and, more particularly, to a game methodology in which a graph type presentation and state flow is used.

In a casino environment, games which provide a story, a sense of progression, and/or an impression of an ability to control a direction the game takes as it progresses can increase player engagement. Increased player engagement in turns leads to increased use of the game and revenues for the operator of the casino. Thus, rather than providing a static game with wins or losses, there is a need to provide a sense of progress and/or an impression of an ability to control a direction the game takes as it progresses through the game, especially in a way that connects to the game in a logical and entertaining way.

BRIEF SUMMARY

Embodiments of the present disclosure are directed to operating an electronic game according to a graph presentation representing a current state and possible future states for the game. According to one embodiment, a method for operating an electronic game can comprise executing an electronic game, presenting a representation of the electronic game, and presenting a representation of a state for the electronic game. The representation of the state can comprise a graph. The graph can comprise a node representing a current state of the electronic game connected by a plurality of edges, each edge further connecting to a node representing each of a first plurality of future states of the electronic game.

An occurrence of a predefined event within the electronic game can be detected. The predefined event can comprise any one or more of a win of a predefined amount, a wager of a predefined amount, a win of a predefined category, a bonus display event, an event based on a player selection, and/or others. A determination can be made as to whether the detected predefined event triggers a change to the state of the electronic game. Determining whether the detected predefined event triggers a change to the state of the electronic game can comprise accumulating a total number of occurrences of the predefined event in the electronic game and determining whether the accumulated total number of occurrences of the predefined event in the electronic game exceeds a predefined threshold.

In response to determining the detected predefined event triggers a change to the state of the electronic game, a player selection of one of the first plurality of future states of the electronic game can be received and the presented representation of the state for the electronic game can be updated based on the received selection of one of the first plurality of future states. Updating the presented representation of the state for the electronic game can comprise making the selected one of the first plurality of future states of the electronic game the current state of the electronic game and generating a second plurality of future states of the electronic game. The second plurality of future states of the electronic game can be dynamically generated based on the received selection of one of the first plurality of future states of the electronic game.

According to another embodiment, a gaming system can comprise a processor and a memory coupled with and readable by the processor. The memory can store therein a set of instructions which, when executed by the processor, causes the processor to execute an electronic game, present a representation of the electronic game, and present a representation of a state for the electronic game. The representation of the state of the game can comprise a graph. The graph can comprise a node representing a current state of the electronic game connected by a plurality of edges, each edge further connected to a node representing each of a first plurality of future states of the electronic game. The representation of the state of the electronic game can further comprise a plurality of tiers. The current state of the electronic game can be represented in a first tier of the plurality of tiers and the first plurality of future states for the electronic game are represented in a second tier of the plurality of tiers.

The instructions can further cause the processor to detect an occurrence of a predefined event within the electronic game and determine whether the detected predefined event triggers a change to the state of the electronic game. For example, the predefined threshold can be associated with the second tier. In another example, the predefined threshold can be associated with the current state for the electronic game. In either case, determining whether the detected predefined event triggers a change to the state of the electronic game can comprise accumulating a total number of occurrences of the predefined event in the electronic game and determining whether the accumulated total number of occurrences of the predefined event in the electronic game exceeds a predefined threshold.

In response to determining the detected predefined event triggers a change to the state of the electronic game, the instructions can further cause the processor to receive a player selection of one of the first plurality of future states of the electronic game and update the presented representation of the state for the electronic game based on the received selection of one of the first plurality of future states. Updating the presented representation of the state for the electronic game can comprise making the selected one of the first plurality of future states of the electronic game the current state of the electronic game and generating a second plurality of future states of the electronic game. The second plurality of future states of the electronic game can be dynamically generated based on the received selection of one of the first plurality of future states of the electronic game. According to one embodiment, the second plurality of futures states for the electronic game can be initially represented in a third tier of the plurality of tiers. In such cases, updating the presented representation of the state of the electronic game can further comprise presenting the second plurality of future states for the electronic game in the second tier of the plurality of tiers, dynamically generating a third plurality of future states for the electronic game based on the generated second plurality of future states for the electronic game, and presenting the third plurality of future states for the electronic game in a third tier of the plurality of tiers.

According to yet another embodiment, a non-transitory, computer, readable medium can comprise a set of instructions stored therein which, when executed by a processor, causes the processor to execute an electronic game, present a representation of the electronic game, and present a representation of a state for the electronic game. The representation of the state can comprise a graph. The graph can comprise a node representing a current state of the electronic game connected by a plurality of edges, each edge further connected to a node representing each of a first plurality of future states of the electronic game. The representation of the state of the electronic game can further comprise a plurality of tiers. The current state of the electronic game can be represented in a first tier of the plurality of tiers, the first plurality of future states for the electronic game can be represented in a second tier of the plurality of tiers, and a third plurality of future states for the electronic game can be represented in a third tier of the plurality of tiers.

The instructions can further cause the processor to detect an occurrence of a predefined event within the electronic game, determine whether the detected predefined event triggers a change to the state of the electronic game, and in response to determining the detected predefined event triggers a change to the state of the electronic game, receive a selection of one of the first plurality of future states of the electronic game. In some cases, the received selection of one of the first plurality of future states of the electronic game can comprise an automatic selection. In other cases, the received selection of one of the first plurality of future states of the electronic game can comprise a player selection. For example, the player selection can comprise selection of an edge of the graph connecting the node representing the current state for the electronic game to the node representing the selected one of the first plurality of future states. In another example, the player selection comprises selection of a node of the graph representing the selected one of the first plurality of future states.

The instructions can further cause the processor to update the presented representation of the state for the electronic game based on the received selection of one of the first plurality of future states. Updating the presented representation of the state for the electronic game can comprise making the selected one of the first plurality of future states of the electronic game the current state of the electronic game and generating a second plurality of future states of the electronic game. The second plurality of future states of the electronic game can be dynamically generated based on the received selection of one of the first plurality of future states of the electronic game.

Additional features and advantages are described herein and will be apparent from the following Description and the figures.

DETAILED DESCRIPTION

Embodiments of the present disclosure are directed to operating an electronic game according to a graph presentation representing a current state and possible future states for the game. Various embodiments described herein provide the player with a graph representing possible choices during game play with each choice influencing a future state and flow of the game. Embodiments allow player input as well as randomness to navigate the graph and determine the flow and outcomes of the game. Various embodiments determine how the player can navigate the graph, how the prizes are awarded based on the graph, and how the player can change the graph.

Figure 1:
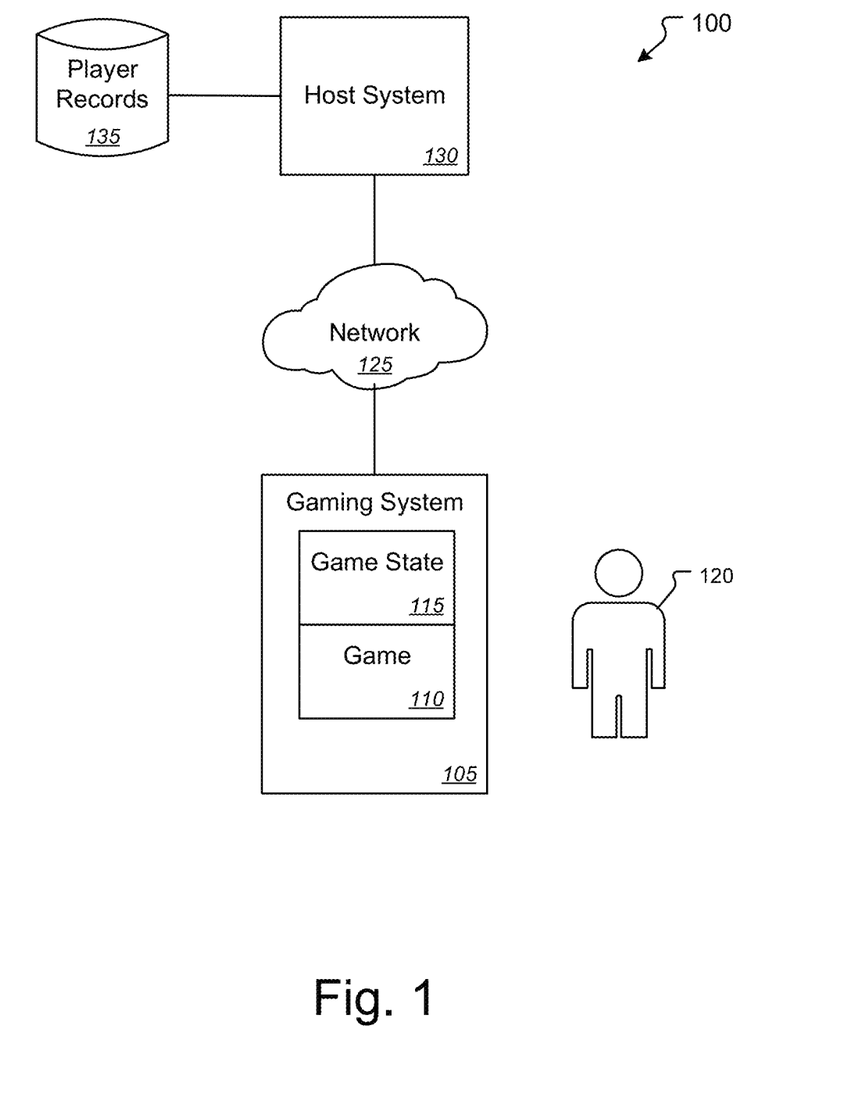
FIG. 1 is a block diagram illustrating an exemplary environment in which node-based game evaluation and game play according to various embodiments of the present disclosure may be implemented.

FIG. 1 is a block diagram illustrating an exemplary environment in which node-based game evaluation and game play according to various embodiments of the present disclosure may be implemented. As illustrated in this example, the environment 100, such as may be found in a casino or other gaming venue, can include a gaming system 105 such as an Electronic Gaming Machine (EGM) or similar system. The gaming system 105 can execute any of a wide variety of electronic games including, but not limited to, slots, video poker, video keno, and/or any other such casino game. During execution of the game, the gaming system 105 can present, e.g., through a display device of the gaming system 105, a representation 110 of the game as well as a representation 115 of a status of the game to a player 120 of the game. As will be described further below, the representation 115 of the status of the game can comprise a graph representing a current state of the game and possible choices during game play with each choice influencing a future state and flow of the game.

As illustrated here, the gaming system 105 can be coupled with a communications network 125. The communications network 125 can comprise any one or more wired and/or wireless, local area and/or wide area networks as known in the art including, but not limited to, the Internet. Also coupled with the communications network can be a host system 130. The host system 130 can comprise any one or more servers and/or other computing devices adapted to support gaming activities within the gaming venue in which the gaming system 105 is installed. Among other things, the host system 130 can receive game play information from the gaming system 105, such as the current state and/or possible future states of an electronic game being conducted thereon and store that information in a player record 135 associated with the player 120 in order to persist the state(s) of that game.

Figure 2:
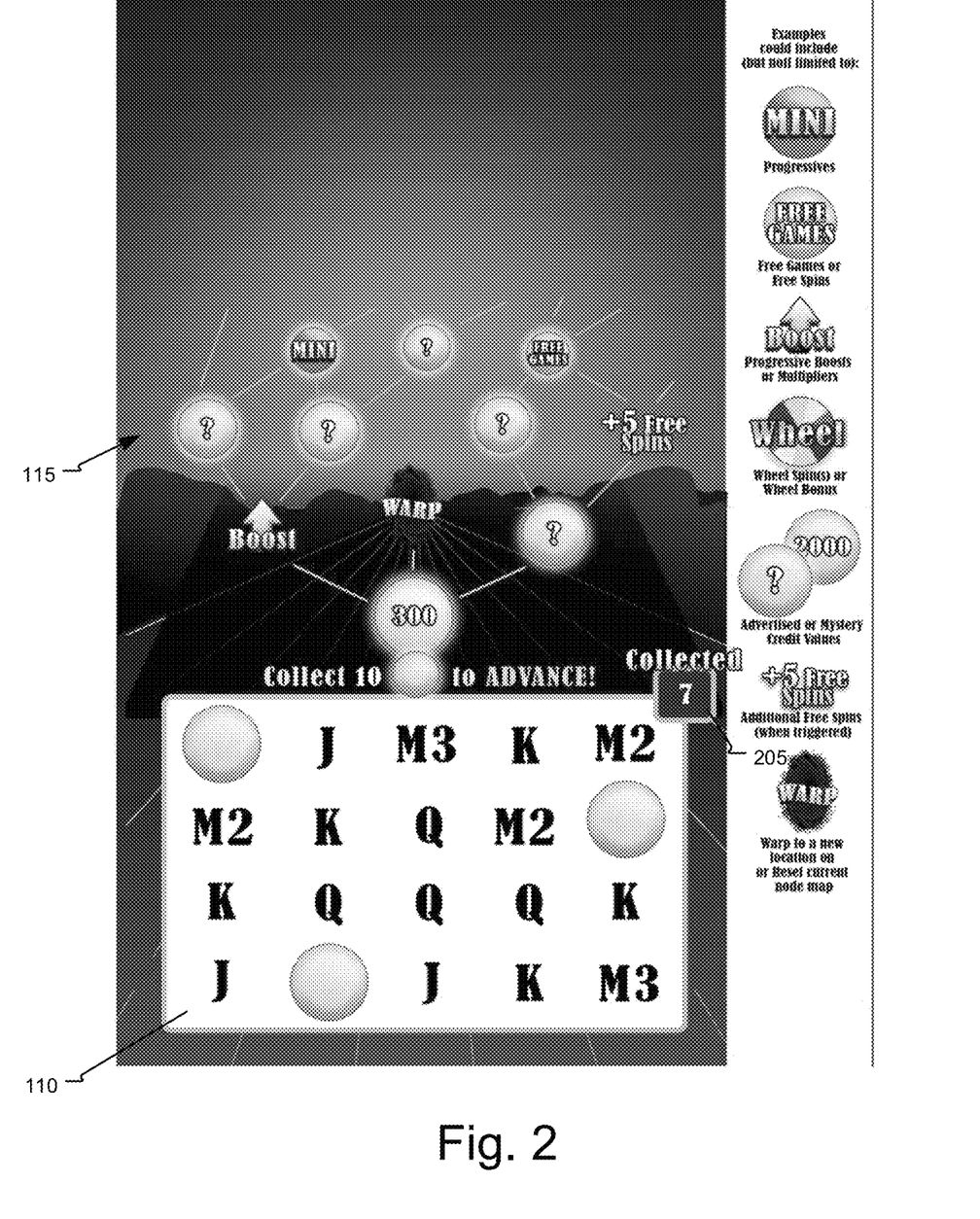
FIG. 2 illustrates an exemplary electronic game interface including presentation of node-based game evaluation and game play according to one embodiment of the present disclosure.

FIG. 2 illustrates an exemplary electronic game interface including presentation of node-based game evaluation and game play according to one embodiment of the present disclosure. More specifically, this example illustrates details of an exemplary representation 110 of an electronic game and a representation 115 of a status of the game as introduced above.

The representation 110 of an electronic game in this example represents a slot game where the slot symbols are J, Q, K, M2 and M3 along with the circle are present. In this example, the player collects the circles through the slot game play. This is likely from getting slot wins on paylines that contain the circles, but other embodiments will also be described. The circles increment the "Collected" meter 205 and when the meter passes the threshold, e.g., 10, the player is able to advance the graph (move from the 300 node to another adjacent node). The circles could be earned from the circles landing on a winning payline, anywhere on the reels, anywhere on the reels when there is a win, anywhere on the reels when there is a scatter win, anywhere on the reels after a substitution, or some other slot type evaluation.

In FIG. 2, some nodes have not been selected and show a "?" to indicate their value is unknown. Additionally, some nodes, such as the "MINI" nodes are shown even though the player has not yet selected or "passed through" that node. Those nodes show the player possible outcomes and gives the player an idea of where to go on the graph. Once a node is selected, the graph can shift down and make the newly selected node the "current node" and the current node becomes the bottom most visual element of the graph. This fun presentation allows the player to have some choice in the types of outcomes they would like to win. Further embodiments will provide more excitement, outcomes, choices and methods to this basic starting concept.

While embodiments will be described in terms of a slot game, embodiments are equally applicable to and useful with other game types including, but not limited to, poker, bingo, keno, sports wagering, Class 3, Class 2 and historical horse racing. Embodiments described herein can be implemented in various type of gaming systems including, but not limited to, Electronic Gaming Machines (EGMs), Video Lottery Terminals (VLTs), sport wagering terminals, online games, mobile games, skill games, random games, games for money and social games (games played that do not win real money).

According to one embodiment, the player 120 can begin playing the game on the gaming system 105. The game could be any type of base game or bonus game. In the examples described herein this is a slot game. The game logic can determine if any game events trigger a graph modification event. In one embodiment the graph modification event can increment the graph accumulation, but other possibilities will be described. For example, the game events that can trigger the graph modification can be any one or more of a win amount of a certain amount, a wager of a certain amount, a win of a certain category (3 cherry win, royal flush, etc.), a bonus display event, a system event, a random event, a player choice event, or other.

In one embodiment the number of graph modification events can also be determined by the base game triggering event in the embodiment where the present invention is used on a base game. For example, if the bonus is triggered by a 3 cherry line win, the bonus game might award one level of triggering events (one set of events that can trigger the modification) while in a 5 cherry line win, another set of events is provided.

The gaming system 105 can then determine the number of graph modification events to award the player or game. For example, a 3 cherry free spin win might award 1 and a 5 cherry win might win 4 accumulations. In one embodiment, the game then adds the won accumulation to the displayed meter of total accumulations of the game.

The number of accumulations could be fixed, such as 10 per "tier" of the graph. In another embodiment the number of accumulations needed can be different per tier. In another embodiment the number of accumulations can be per node, such as increasing by one with each node won or randomly.

After adding to the accumulation the gaming system 105 can determine how many, if any, game modification events are awarded to the player. In one embodiment, there can be a fixed number, such as 10, after which the player wins a modification event. For example, after the accumulation, the player has 12 on the accumulation meter so the player is awarded 1 modification because the game was configured for 1 modification for every accumulation of 10.

In one embodiment, the player may be able to choose how to apply the modification. This is the player choosing which edge on the graph to advance given the current node. In the event that there is only one possible edge to pick, the game might automatically choose the edge. In one embodiment the edge can be randomly chosen and not chosen by the player. In another embodiment, the player can choose the destination node and the game choose the correct edge to get to the desired node.

After the new edge is selected, the graph can be updated to the node to which the selected edge that was chosen. The display updates to indicate the new current node. At this point the player might be awarded zero or more prizes which could be money, player points, "Graph Points" (explained later), a multiplier, a free spin, nothing, or something else.

Figure 3A:
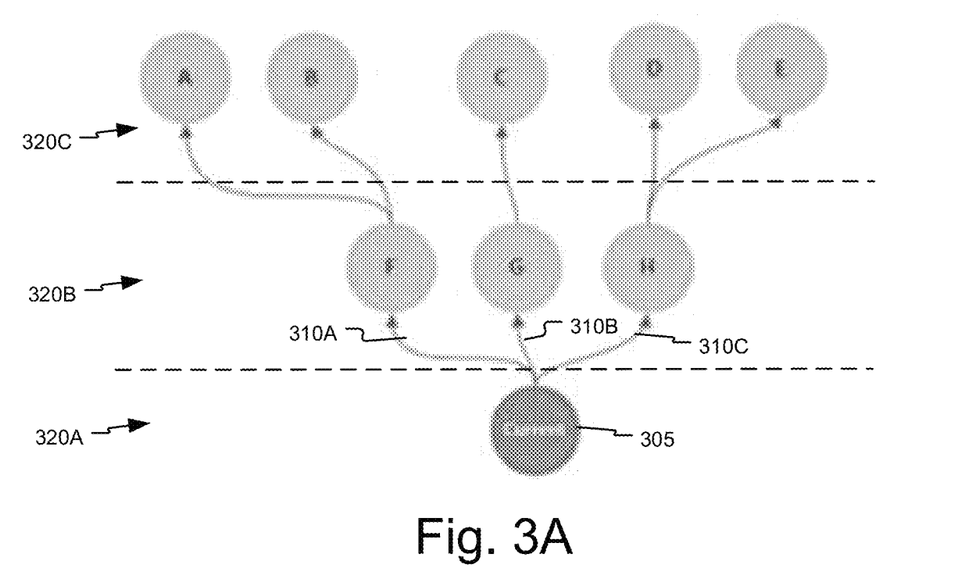
FIGS. 3A and 3B are block diagrams illustrating an example of navigation between states in node-based game evaluation and game play according to one embodiment of the present disclosure.
Figure 3B:
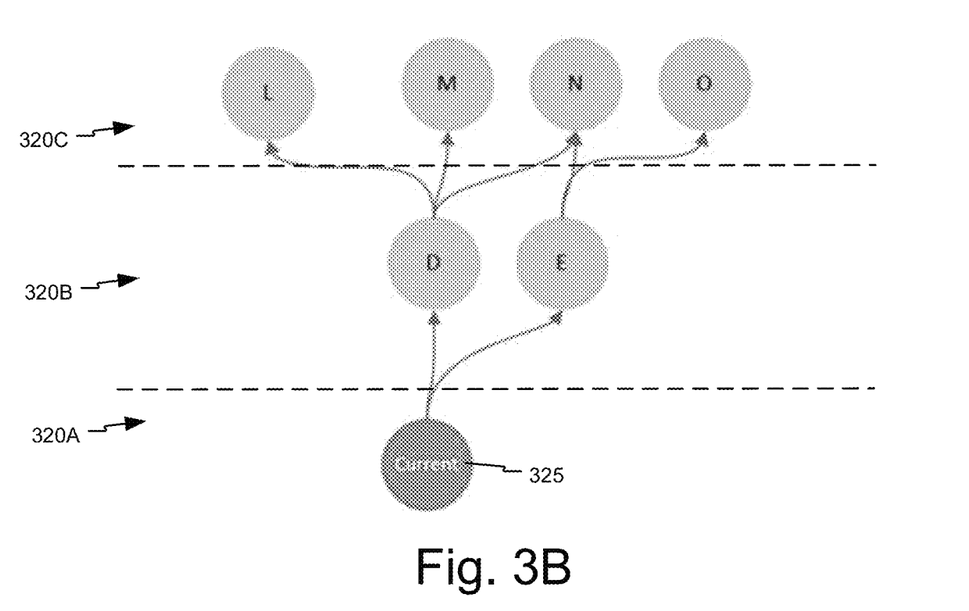

FIGS. 3A and 3B are block diagrams illustrating an example of navigation between states in node-based game evaluation and game play according to one embodiment of the present disclosure. As illustrated in FIG. 3A, the graph can comprise a node 305 representing a current state of the electronic game connected by a plurality of edges 310A-310C, each edge further connected to a node F, G, H representing each of a first plurality of future states of the electronic game. The representation of the state of the electronic game can further comprise a plurality of tiers 320A-320C. The current state of the electronic game can be represented in a first tier 320A of the plurality of tiers and the first plurality of future states for the electronic game can be represented in a second tier 320B of the plurality of tiers. In some cases, a second plurality of futures states for the electronic game can be initially represented in a third tier 320C of the plurality of tiers.

In the example of FIGS. 3A and 3B, the player chooses node H. As shown in FIG. 3B, the nodes shift down. The current node 325 (previously H) is now at the bottom, in the first tier 320A. Nodes A, B, C, F and G are now hidden because there is no edge to reach them. Of course, this is just an example of the movement and display and other variations are possible including left to right, shifting up, etc. In one embodiment the graph has one starting node, while in another embodiment the graph has more than one starting node. In one embodiment the graph keeps growing and has no end. The game dynamically creates the graph. In one embodiment the graph can have one or more "ends". When the player reaches the end, the graph can change the current node to the starting node. When there is more than one starting node, the game can randomly choose a starting node or allows the player to choose the starting node.

In one embodiment there are "warp" nodes. When the current node is the warp node (the player was won the warp node) the current node can jump to another node on the graph. In one embodiment, the destination node can be random. In one embodiment, the destination node can be randomly picked from a set of possible destination nodes where the number of destination nodes are less than the available nodes on the graph.

In some embodiments the graph can be larger than the displayable area such that the player can only see a certain region of the graph and those choices that are near the current node. In some embodiments, the current node may not be displayed to save space in the display.

In one embodiment the value of each node may not be known or shown to the player until that node is selected and the value is revealed to the player. For example, the node might show "?" and when the player reaches that node the game awards the player $5.00.

In one embodiment, the values of each node may be partially obscured. For example, a node showing "2?" could award 20, 200, or 2000 credits when the player reaches and is awarded that node. Or a "?00" could award 100, 200, 300 . . . credits when the player reaches and is awarded that node.

In one embodiment, one or more nodes can have their values revealed in the graph to give the player some indication on the "direction" to head in the graph. Determining which nodes to reveal or hide could be a decision based on one or more of a random factor such as revealing 3 nodes, the player having a loyalty account, e.g., players with loyalty accounts can see more node values or certain node types (e.g., progressives), the denomination of the game being played, a node modification event, e.g., the player uses "Graph Points" to request that one or more node values be revealed, revealed randomly, or at the selection of the player.

In one embodiment the graph can dynamically change over time such as based on a timer. For example, the game might provide the player with a two minute timer. After the two minutes the graph can adjust. The adjustment could make the prizes on the graph move further away from the players current node. For example, the player is 1 node away from a progressive. After the timer expires (2 minutes in this example), the progressive prizes move away from the current node and is now 2 nodes away from the current node. This encourages players to play faster and causes a frenzy. This is likely to also be combined with the communal embodiments described in this document.

In one embodiment, the remaining amount of time on the timer can scale the award of the node if it is reached. For example, reaching the next node with 90 second left on the time would win more than reaching the same node with 30 seconds on the timer. The scaling could also affect which prize is awarded (e.g., money vs points) or the number of prizes awarded.

In one embodiment, the player can win "graph points" on the nodes or from the bonus game win. For example, when the player chooses a node or edge, the player might win 10 graph points. These graph points can be spent on the graph modification. The graph points could be used to buy one or more of unlock an edge (make it possible to reach a certain node), reveal the value of a node, skip past a node, add a prize to the graph, progressive, free spin, more graph points, player loyalty points, warp, add a warp to the graph, warp source or destination could be added, extend the time when there is a timer, add more triggering events to the slot game ("graph modification events"), enable a faster mode on the slot game, enable bashing which is the ability to stop the reels and therefore play the slot game faster. Playing faster can make it easier to get to the next node before the timer expires (when there is a timer).

According to one embodiment, two or more nodes can be combined to become one node and the prizes can be combined into the single node. Additionally, or alternatively, a node can be split into multiple nodes on the graph.

In one embodiment, reaching the node may require an additional evaluation or game to determine the value. For example, the player might reach a node that says "Progressive" but the player does not know which progressive they have won. A second game can be played, such as spinning a wheel to determine the final prize (which progressive the player has won).

In some embodiments, there could be different types of node, e.g., with different colors, pictures, text, animations or sounds. For simplicity this will be described as colors, such as red, green and blue colored nodes. The accumulation points can therefore be tracked for red, green and blue. The slot game would then have some events increment the red accumulation, others the green and others the blue. The player can advance to a blue node when the player has enough blue accumulation points. This can cause a "gating" effect where the player has plenty of red and yellow nodes, but not blue. If the player is stuck on a blue node, when enough blue accumulation points are acquired the player advances past the blue node, but also can advance, either automatically or via player selection, past further nodes. The result can be the player moving through more than one node after the unlock and selection of the blue node.

In one embodiment all nodes are available to the player. In another embodiment, some nodes are only available when the player plays at a certain denomination or wager level. For example, some nodes may require a denomination of 25 cents while other nodes require a one-dollar denomination. In one embodiment, some nodes may only be available to players who have a player loyalty account. In one embodiment, the node may only be available (or partially determined by) the level of the player loyalty account (gold, silver, bronze member). For example, a node might require a $1.00 denomination OR 25 cent denomination for a gold player.

In one embodiment, the player can see the nodes that he/she cannot reach. They can be displayed in some disabled fashion such as in the color gray, a missing edge to reach the node, etc. In one embodiment, there may also be an indication of why the node is disable such as text saying: "Requires $1.00 denom". If a player loyalty account is required, the display might show a logo of the casino indicating the requirements for the player loyalty account.

In one embodiment, the player may collect one or more node prizes to unlock a node later. For example, the player might reveal a node and win the "Progressive Unlock". The player is now eligible to navigate and win progressive nodes. The unlock might expire with time or with advancing nodes. Hitting the progressive award could remove the Progressive Unlock or keep it for a certain time or number of nodes.

In one embodiment, the host system 130 or gaming system 105 can remember the state of the graph. The state can either be associated with the theme, a paytable or a paytable and denomination. The state of the graph could include the accumulation meter. In one embodiment, the state of the graph can be stored with the player's identity such as with the player's loyalty account or mobile device and maintained by the host system in the player records 135. In one embodiment, the state of the graph is not associated with the player's loyalty account or the particular player. If a first player puts the graph into a certain state it can remain in that state even when next player uses the gaming system 105. In one embodiment, the graph resets, i.e., starts from the beginning, when a new player starts to use the gaming system 105.

In some embodiments, the graph can be a communal game where more than one player is navigating the graph. This could be a bank of 8 machines with up to 8 players navigating the graph. It could also be a casino wide or market wide communal game.

In the communal view the player can see where the other players are on the graph and therefore know which direction the other players intend to go.

In one embodiment, all node awards and/or graph points can be available to all players.

In one embodiment, all node awards and/or graph points can be available to the first player to reach the node. In similar embodiments, the 2nd and 3rd players (up to n) could receive the node prize or a scaled down prize. For example, Player 1 reaches the node and wins $10.00. Player 2 reaches the same node after Player 1 and receive $5.00. All subsequent players after Player 2 reaching the same node receive nothing.

In one embodiment, the graph display can show when a node has been reached by another player and no prize is available.

In one embedment, the graph display can show how many players can collect the node value, how many have already collected the node value and/or the remaining prizes for the node.

In one embodiment, the nodes can have more than one prize. The first person reaching the node can pick the prize they want, and that prize is removed from the possible prizes for that node.

In one embodiment, two or more players must reach a node before any players can advance past the node. This is a "gating node" that causes two or more players to come together and might encourage cooperation and social interactions.

In one embodiment, the player can exchange, trade or give their "graph points" to other players.

In one embodiment, the values on the graph can be scaled by the number of players currently playing on the communal graph. For example, when 8 players are playing, the monetary awards are larger than when 1 player is playing. In a similar embodiment, the graph prizes can change based on the number of players. For example, when there are more players there are more warp prizes or more progressive prizes.

In one embodiment, when one player reaches a node and reveals a prize, other players get the same, a fraction, or some prize also.

When the presence of a player loyalty account is needed, the EGM, the service window of the EGM, or the mobile application might allow the player to create a loyalty account and immediately enable the player loyalty features of the graph.

A player might have certain achievements that are status that unlock the edge or features previously described. The player might be a member of a certain group or club that might provide the status. The player might have placed a sports wager, used a casino service, spent a certain amount of money at the casino or bought a hotel room to achieve the status necessary.

Figure 4:
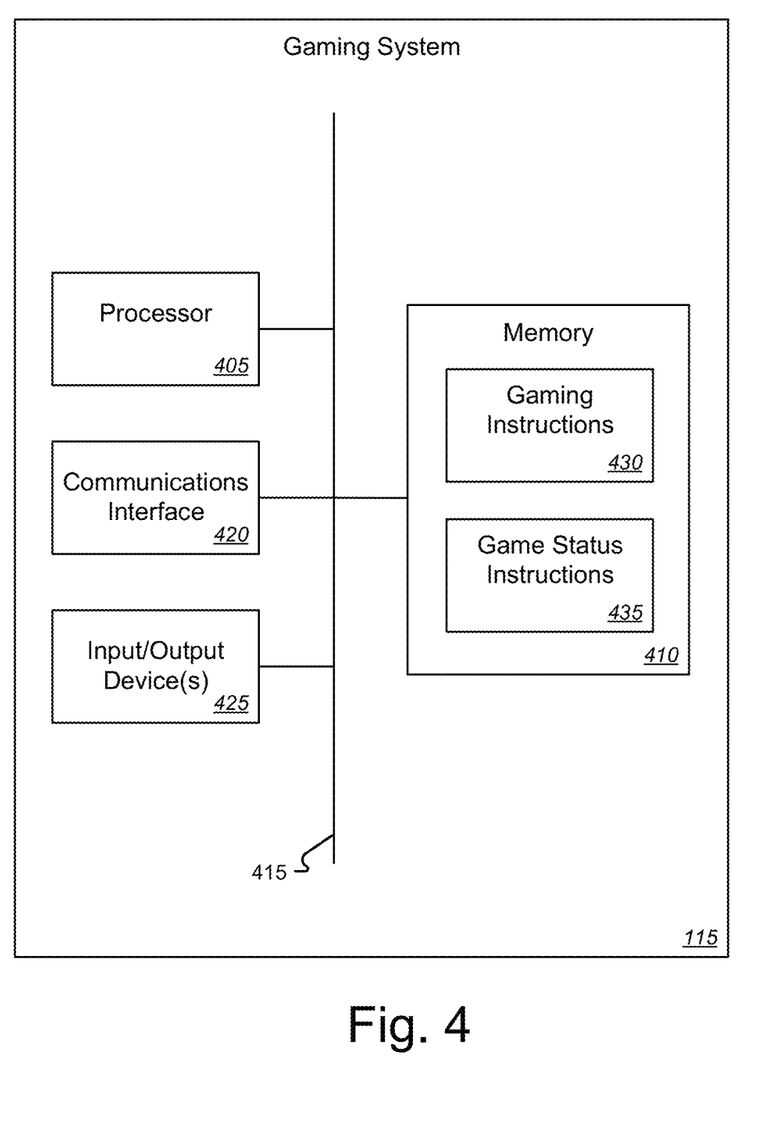
FIG. 4 is a block diagram illustrating additional details of components of an exemplary gaming system according to one embodiment of the present disclosure.

FIG. 4 is a block diagram illustrating additional details of components of an exemplary gaming system according to one embodiment of the present disclosure. As illustrated in this example, a gaming system 105 can comprise a processor 405. The processor 405 may correspond to one or many computer processing devices. For instance, the processor 405 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 405 may be provided as a microprocessor, Central Processing Unit (CPU), or plurality of microprocessors that are configured to execute the instructions sets stored in a memory 410. Upon executing the instruction sets stored in memory 410, the processor 405 enables various functions of the gaming system 105 as described herein.

The memory 210 can be coupled with and readable by the processor 205 via a communications bus 415. The memory 410 may include any type of computer memory device or collection of computer memory devices. Non-limiting examples of memory 410 include Random Access Memory (RAM), Read Only Memory (ROM), flash memory, Electronically-Erasable Programmable ROM (EEPROM), Dynamic RAM (DRAM), etc. The memory 410 may be configured to store the instruction sets depicted in addition to temporarily storing data for the processor 405 to execute various types of routines or functions.

The processor 405 can also be coupled with one or more communication interfaces 420 and one or more input/output devices 425 via the communications bus 415. The communication interfaces 420 can comprise, for example, a Bluetooth, WiFi, cellular, and/or other type of wireless communications interface. The input/output devices 425 can include, but are not limited to a display device such as a Liquid Crystal Display (LCD), Light Emitting Diode (LED), Organic Light Emitting Diode (OLED), or other type of display.

The memory 410 can store therein a set of gaming instructions 430 which, when executed by the processor 405, cause the processor 405 to execute an electronic game and present a representation of the game one a display device or other input/output device 425. The memory 410 can also store therein a set of game status instructions 435 which, when executed by the processor 405, causes the processor 405 to present a representation 115 of a state for the electronic game such as a graph as described above.

The game status instructions 435 can further cause the processor 405 to detect an occurrence of a predefined event within the electronic game. The predefined event can comprise any one or more of a win of a predefined amount, a wager of a predefined amount, a win of a predefined category, a bonus display event, an event based on a player selection, and/or other event.

The game status instructions 435 can further cause the processor 405 to make a determination as to whether the detected predefined event triggers a change to the state of the electronic game. Determining whether the detected predefined event triggers a change to the state of the electronic game can comprise accumulating a total number of occurrences of the predefined event in the electronic game and determining whether the accumulated total number of occurrences of the predefined event in the electronic game exceeds a predefined threshold. For example, the predefined threshold can be associated with the second tier. In another example, the predefined threshold can be associated with the current state for the electronic game.

In response to determining the detected predefined event triggers a change to the state of the electronic game, the game status instructions 435 can further cause the processor 405 to receive a player selection of one of the first plurality of future states of the electronic game. In some cases, the received selection of one of the first plurality of future states of the electronic game can comprise an automatic selection. In other cases, the received selection of one of the first plurality of future states of the electronic game can comprise a player selection. For example, the player selection can comprise selection of an edge of the graph connecting the node representing the current state for the electronic game to the node representing the selected one of the first plurality of future states. In another example, the player selection can comprise selection of a node of the graph representing the selected one of the first plurality of future states.

The game status instructions 435 can further cause the processor 405 to update the presented representation of the state for the electronic game can then be updated based on the received selection of one of the first plurality of future states. Updating the presented representation of the state for the electronic game can comprise making or assigning the selected one of the first plurality of future states of the electronic game the current state of the electronic game, i.e., moving the selected future state from the second tier to the first tier if the representation of the state of the game. In some cases, the second plurality of future states for the electronic game from the third tier of the representation of the state of the game can be presented in the second tier of the plurality of tiers. In other cases, the second plurality of future states of the electronic game can be dynamically generated based on the received selection of one of the first plurality of future states of the electronic game if the second plurality of future states are not yet presented. In some cases, a third plurality of future states for the electronic game can be dynamically generated based on the generated second plurality of future states for the electronic game and the third plurality of future states for the electronic game can be presented in a third tier of the plurality of tiers.

Figure 5:
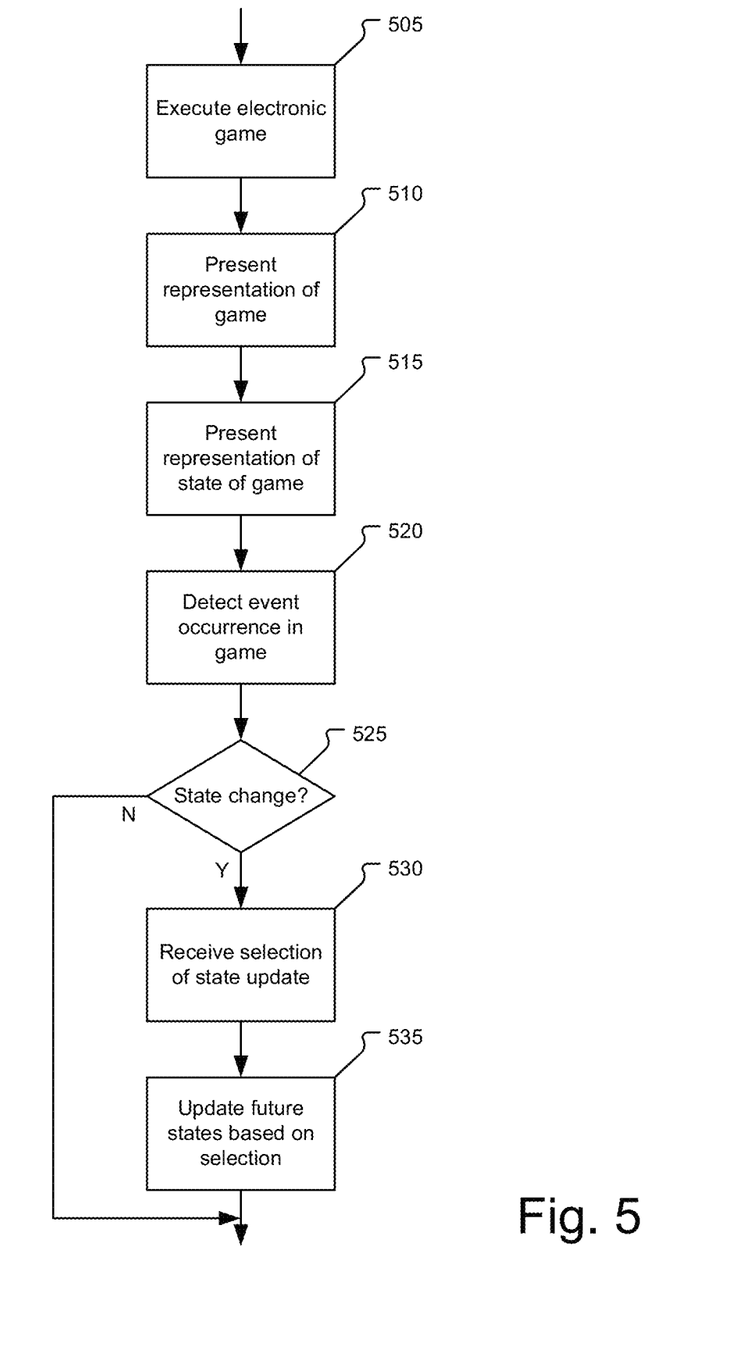
FIG. 5 is a flowchart illustrating an exemplary process for operating a game according to one embodiment of the present disclosure.

FIG. 5 is a flowchart illustrating an exemplary process for operating a game according to one embodiment of the present disclosure. As illustrated in this example, operating an electronic game can comprise executing 505, by a gaming system 105, an electronic game presenting 510 a representation 110 of the electronic game, and presenting 515 a representation 115 of a state for the electronic game. The representation 115 of the state can comprise a graph. The graph can comprise a node representing a current state of the electronic game connected by a plurality of edges, each edge further connected to a node representing each of a first plurality of future states of the electronic game. The representation of the state of the electronic game can further comprise a plurality of tiers. The current state of the electronic game can be represented in a first tier of the plurality of tiers and the first plurality of future states for the electronic game can be represented in a second tier of the plurality of tiers. In some cases, a second plurality of futures states for the electronic game can be initially represented in a third tier of the plurality of tiers.

An occurrence of a predefined event within the electronic game can be detected 520. The predefined event can comprise any one or more of a win of a predefined amount, a wager of a predefined amount, a win of a predefined category, a bonus display event, an event based on a player selection, and/or other event. A determination 525 can be made as to whether the detected predefined event triggers a change to the state of the electronic game. Additional details of an exemplary process for determining 525 whether the detected predefined event triggers a change to the state of the electronic game will be described below with reference to FIG. 6.

In response to determining 525 the detected predefined event triggers a change to the state of the electronic game, a player selection of one of the first plurality of future states of the electronic game can be received 530. In some cases, the received selection of one of the first plurality of future states of the electronic game can comprise an automatic selection. In other cases, the received selection of one of the first plurality of future states of the electronic game can comprise a player selection. For example, the player selection can comprise selection of an edge of the graph connecting the node representing the current state for the electronic game to the node representing the selected one of the first plurality of future states. In another example, the player selection can comprise selection of a node of the graph representing the selected one of the first plurality of future states.

The presented representation of the state for the electronic game can then be updated 535 based on the received selection of one of the first plurality of future states. Additional details of an exemplary process for updating 535 the presented representation of the state for the electronic game will be described below with reference to FIG. 7.

Figure 6:
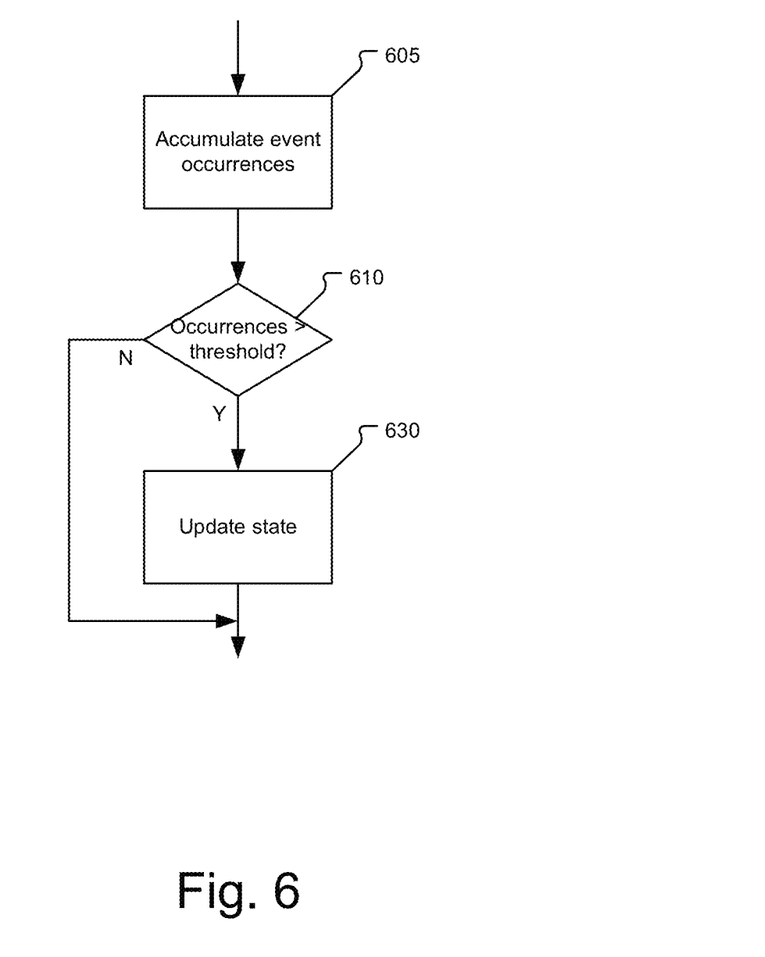
FIG. 6 is a flowchart illustrating additional details of an exemplary process for triggering a state change in an electronic game according to one embodiment of the present disclosure.

FIG. 6 is a flowchart illustrating additional details of an exemplary process for triggering a state change in an electronic game according to one embodiment of the present disclosure. As illustrated in this example, determining whether the detected predefined event triggers a change to the state of the electronic game can comprise accumulating 605 a total number of occurrences of the predefined event in the electronic game and determining 610 whether the accumulated total number of occurrences of the predefined event in the electronic game exceeds a predefined threshold. For example, the predefined threshold can be associated with the second tier. In another example, the predefined threshold can be associated with the current state for the electronic game. In either case, in response to determining 610 the accumulated total number of occurrences of the predefined event in the electronic game exceeds the predefined threshold, the presented representation of the state for the electronic game can then be updated 630.

Figure 7:
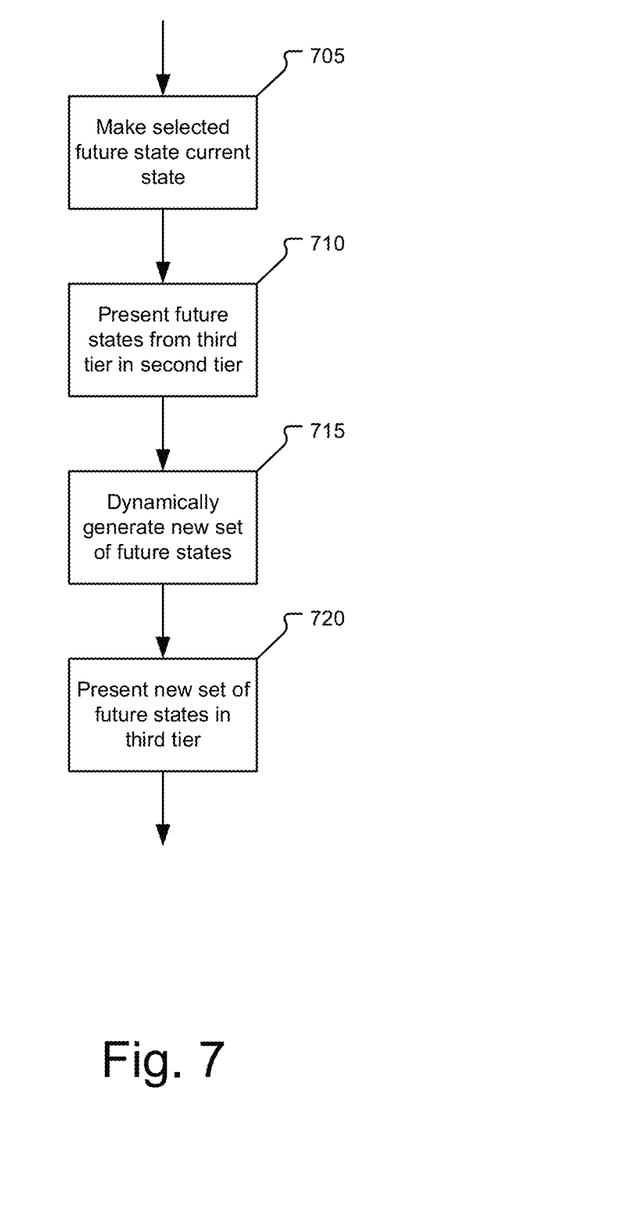
FIG. 7 is a flowchart illustrating additional details of an exemplary process for updating a game state according to one embodiment of the present disclosure.

FIG. 7 is a flowchart illustrating additional details of an exemplary process for updating a game state according to one embodiment of the present disclosure. As illustrated in this example, updating the presented representation of the state for the electronic game can comprise making 705 or assigning the selected one of the first plurality of future states of the electronic game the current state of the electronic game, i.e., moving the selected future state from the second tier to the first tier if the representation of the state of the game.

In some cases, the second plurality of future states for the electronic game from the third tier of the representation of the state of the game can be presented 710 in the second tier of the plurality of tiers. In other cases, the second plurality of future states of the electronic game can be dynamically generated based on the received selection of one of the first plurality of future states of the electronic game if the second plurality of future states are not yet presented.

In some cases, a third plurality of future states for the electronic game can be dynamically generated 715 based on the generated second plurality of future states for the electronic game and the third plurality of future states for the electronic game can be presented 720 in a third tier of the plurality of tiers.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method for operating an electronic game, the method comprising:
   executing, by a gaming system, an electronic game;
   presenting, by the gaming system, a representation of the electronic game;
   presenting, by the gaming system, a representation of a state for the electronic game, wherein the representation of the state comprises a graph, the graph comprising a node representing a current state of the electronic game connected by a plurality of edges, each edge further connected to a node representing each of a first plurality of future states of the electronic game;
   detecting, by the gaming system, an occurrence of a predefined event within the electronic game;
   determining, by the gaming system, whether the detected predefined event triggers a change to the state of the electronic game;
   in response to determining the detected predefined event triggers a change to the state of the electronic game, receiving, by the gaming system, a player selection of one of the first plurality of future states of the electronic game; and
   updating, by the gaming system, the presented representation of the state for the electronic game based on the received selection of one of the first plurality of future states, wherein updating the presented representation of the state for the electronic game comprises making the selected one of the first plurality of future states of the electronic game the current state of the electronic game and generating a second plurality of future states of the electronic game, and wherein the second plurality of future states of the electronic game are dynamically generated based on the received selection of one of the first plurality of future states of the electronic game.

2. The method of claim 1, wherein determining whether the detected predefined event triggers a change to the state of the electronic game comprises:
   accumulating a total number of occurrences of the predefined event in the electronic game; and
   determining whether the accumulated total number of occurrences of the predefined event in the electronic game exceeds a predefined threshold.

3. The method of claim 1, wherein the predefined event comprises a win of a predefined amount.

4. The method of claim 1, wherein the predefined event comprises a wager of a predefined amount.

5. The method of claim 1, wherein the predefined event comprises a win of a predefined category.

6. The method of claim 1, wherein the predefined event comprises a bonus display event.

7. The method of claim 1, wherein the predefined event comprises an event based on a player selection.

\* \* \* \* \*